United States Patent [19]

Tyler

[11] Patent Number: 5,908,118

[45] Date of Patent: Jun. 1, 1999

[54] APPARATUS FOR MEDIA STORAGE

[75] Inventor: Thomas C. Tyler, Hopkins, Minn.

[73] Assignee: Core Technolgies, Inc., Eden Prairie, Minn.

[21] Appl. No.: 08/855,431

[22] Filed: May 13, 1997

[51] Int. Cl.⁶ ....................................................... A47F 5/00
[52] U.S. Cl. .................... 211/40; 211/41.12; 206/387.15; 206/308.1
[58] Field of Search .................................. 211/40, 41.12, 211/126.1, 126.2, 126.3; 206/387.15, 387.14, 308.1

[56] References Cited

U.S. PATENT DOCUMENTS

| | | | |
|---|---|---|---|
| 3,938,871 | 2/1976 | Bartholomew | 312/240 |
| 4,584,950 | 4/1986 | Adams et al. | 211/41 |
| 4,650,072 | 3/1987 | Ackeret | 211/40 X |
| 4,782,958 | 11/1988 | Price et al. | 211/41.12 |
| 4,815,795 | 3/1989 | Accumanno et al. | 211/40 X |
| 4,846,355 | 7/1989 | Price, Sr. et al. | 211/41 |
| 4,889,244 | 12/1989 | Hehn et al. | 211/40 X |
| 5,320,244 | 6/1994 | Yu . | |
| 5,427,446 | 6/1995 | Glomski | 312/242 |

FOREIGN PATENT DOCUMENTS

| | | |
|---|---|---|
| 0204072 | 12/1986 | European Pat. Off. . |
| 0247867 | 12/1987 | European Pat. Off. . |
| 2088200 | 4/1981 | United Kingdom . |
| 2282524 | 4/1985 | United Kingdom . |
| 2190829 | 12/1987 | United Kingdom . |
| 91/19446 | 12/1991 | WIPO . |

Primary Examiner—Robert W. Gibson, Jr.
Attorney, Agent, or Firm—Schwegman, Lundberg Woessner & Kluth P.A.

[57] ABSTRACT

A media storage container is constructed from a first universal molded plastic component that is mated with a selected one of a plurality of other components each customized to hold media items of a particular type.

9 Claims, 9 Drawing Sheets

APPARATUS FOR MEDIA STORAGE

BACKGROUND OF THE INVENTION

1. Field of the Invention

The invention relates to a storage pack used primarily within a storage rack designed to accommodate singular or multiple types of information storage media or materials such as computer or micrographics tapes and cartridges.

2. Description of the Prior Art

It is necessary to store large quantities of computer and graphic information storage media of all kinds in such a way that the stored items may be quickly located and retrieved. For maximum storage density, it is also necessary to provide a means to secure more than one type of media in packs having a common relationship when they are placed in a high density storage rack.

Prior art media storage packs, such as those produced from metal or molded plastic, have several limitations. The most severe limitation is a lack of flexibility for the storage of new computer and optical media being introduced into the market at an ever increasing pace. Recent technical developments have produced numerous competing storage schemes of a proprietary nature for data storage and retrieval. This has meant that an increasing variety of media cassettes, disks and storage mechanisms are being marketed for the storage of large volumes of data. Thus, different varieties and sizes of media are difficult to store in a uniform manner and with maximum space efficiency, especially when media packs are placed into a high density rack system.

In the recent history of large computer users, many such users have converted their media type from that of large reels of tape and removable disk arrays to one using a fairly standard cartridge design. This standard cartridge design led to the development, by those skilled in the art, of several types of packs for the storage of this single size of cartridge. However, among competing pack designs, the one constant element was the space required for this standard cartridge whose outer dimensions did not vary in any significant manner from cartridge manufacturer to cartridge manufacturer. Recently introduced internal improvements to this standard cartridge have not changed the exterior cartridge dimensions or the space required for its storage in a pack.

With the introduction of very new media, having generally, but not universally, reduced dimensions, the compartments created in packs produced for the storage of the previously standard cartridge would often suffice. However, since newer computer media tends to be progressively smaller, a significant amount of volumetric waste is created when smaller media is stored in a pack area designed to hold larger media Also, some of the newest media, particularly that of an optical nature, often has one or two dimensions that grossly exceed the dimensions of the previously standard cartridge. Thus, new media might not be able to fit in the standard spaces of a previous pack. In any event, those wishing to store large quantities of newer media usually were faced with the purchase of entirely new packs and/or storage racks plus having a very limited monetary value that might exist in obsolete packs and/or storage racks.

SUMMARY OF THE INVENTION

To overcome these and other limitations, the subject invention provides a workable solution for the present and the foreseeable future of computer and micrographics media storage packs. In particular, one purpose of the invention is to reduce the embodiments of the prior art to a uniform pack exterior size that will accommodate within its changeable interior, multiple varieties of substantially different sizes and types of items.

Another purpose of the invention is to provide a means whereby substantially different varieties of media may coexist within a pack storage rack at vertically and horizontally interchangeable positions.

Another purpose of the invention is to make use of, and the reuse of, common portions of packs designed for the storage of substantially different items in order to reduce environmental waste created by discarded packs not suitable for use with newer or multiple varieties of media.

Another purpose of the invention is to reduce the cost to manufacture new packs each of totally dedicated design.

Another purpose of the invention is to maximize the storage density of multiple versions of small media having similar size.

Another purpose of the invention is to provide a means whereby future media, whose exact size and shape is presently unknown, may be accommodated by a different back unit designed to attach to an existing pack frame.

DESCRIPTION OF THE PREFERRED EMBODIMENTS

Figure 1:
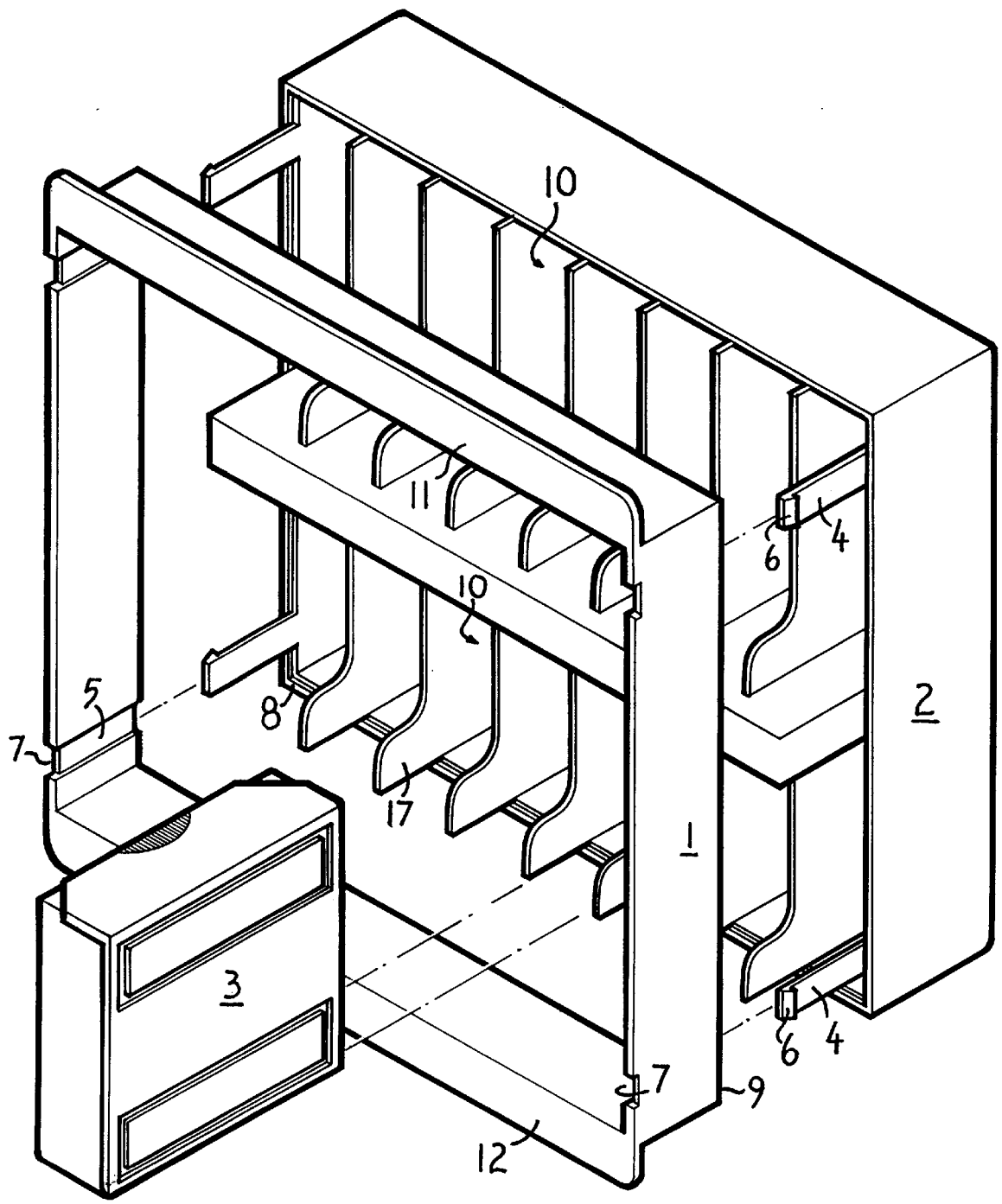
FIG. 1 is an exploded perspective of the multi-pack showing how it assembles and how a media cartridge would be placed in the multi-pack.

FIG. 1 is a perspective view of the front frame 1 placed in front of a particular back unit 2 suitable for storage of a multiple number of cartridges 3 (e.g. a DLT type of cartridge in its' storage box) of the particular type shown. The locking bars 4 projecting outward from the back unit 2 engage the alignment slots 5 of the front frame 1 as the back unit 2 is mated with front frame 1. Hooks 6 located on the locking bar 4 ends engage their respective front frame 1 locking slots 7 when the front frame 1 is fully seated against a back unit 2. When the two parts, namely the front frame 1 and the back unit 2 are thus engaged, a multi-pack for the storage of a plurality of similarly sized items is created. This assembled multi-pack may now be placed in a storage rack by engagement of its upper flange 11 in a suitable downward facing horizontal storage rack channel and its lower flange 12 placed in a suitable upward facing horizontal storage rack channel.

To maintain necessary lateral stability of the assembled frame 1 and back unit 2, the outer lip 8 of the back unit 2 is offset to the outside of a corresponding grove along the outside of the rear edge 9 of the otherwise laterally weak front frame 1. Thus, sufficient stability is created to easily place and remove the assembled multi-pack FIGS. 2 & 3 in a storage rack or to move the multi-pack individually and laterally from side to side when placed in the appropriate horizontal channels of a high density storage rack.

The size and number of uniform openings 10 formed in the back unit 2 are designed from two outer dimensions of the particular media 3 being stored in the assembled pack.

Figure 2:
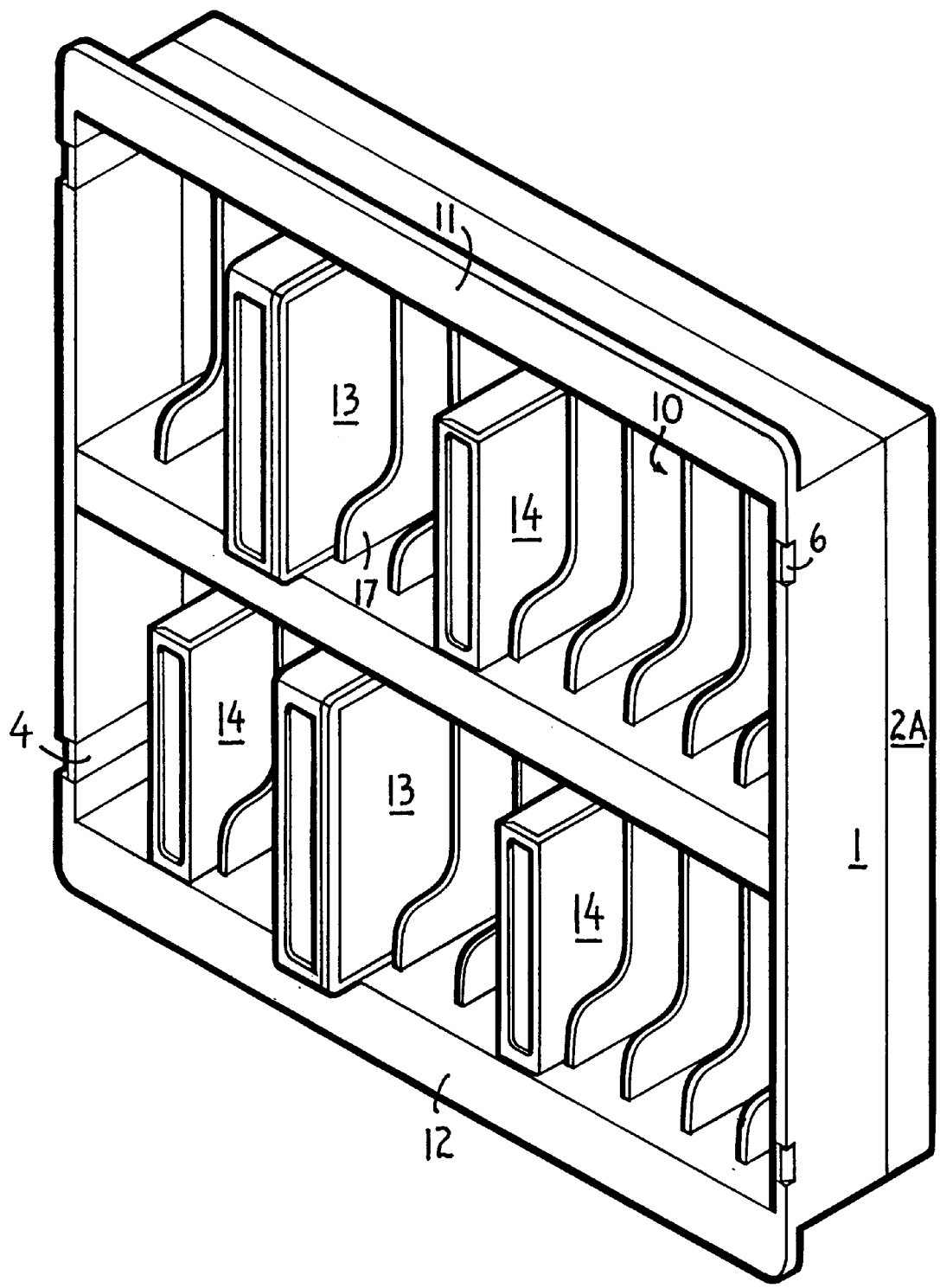
FIG. 2 illustrates an assembled multi-pack of minimal depth with a plurality of two similar sizes of cartridge installed.

FIG. 2 illustrates the assembly of a front frame 1 to a different back unit 2A having a larger number of uniform openings 10 than shown in the back unit 2 of FIG. 1. It also illustrates slightly different, similar sizes of media 13 and 14 being stored in the assembled multi-pack. FIG. 2 further illustrates an assembled multi-pack having the same height and width as that of FIG. 1 with a higher density of media units being stored. FIG. 2 also illustrates small media 13 (e.g. 8 mm DAT tape) and 14 (e.g. 4 mm DAT tape) stored relatively close to, or in front of, the face of the front frame 1. Thus, it is relatively easy to reach said media for retrieval or filing instead of reaching between the relatively deep dividers 17 extending outward from the back of prior art standard cartridge packs.

Figure 3:
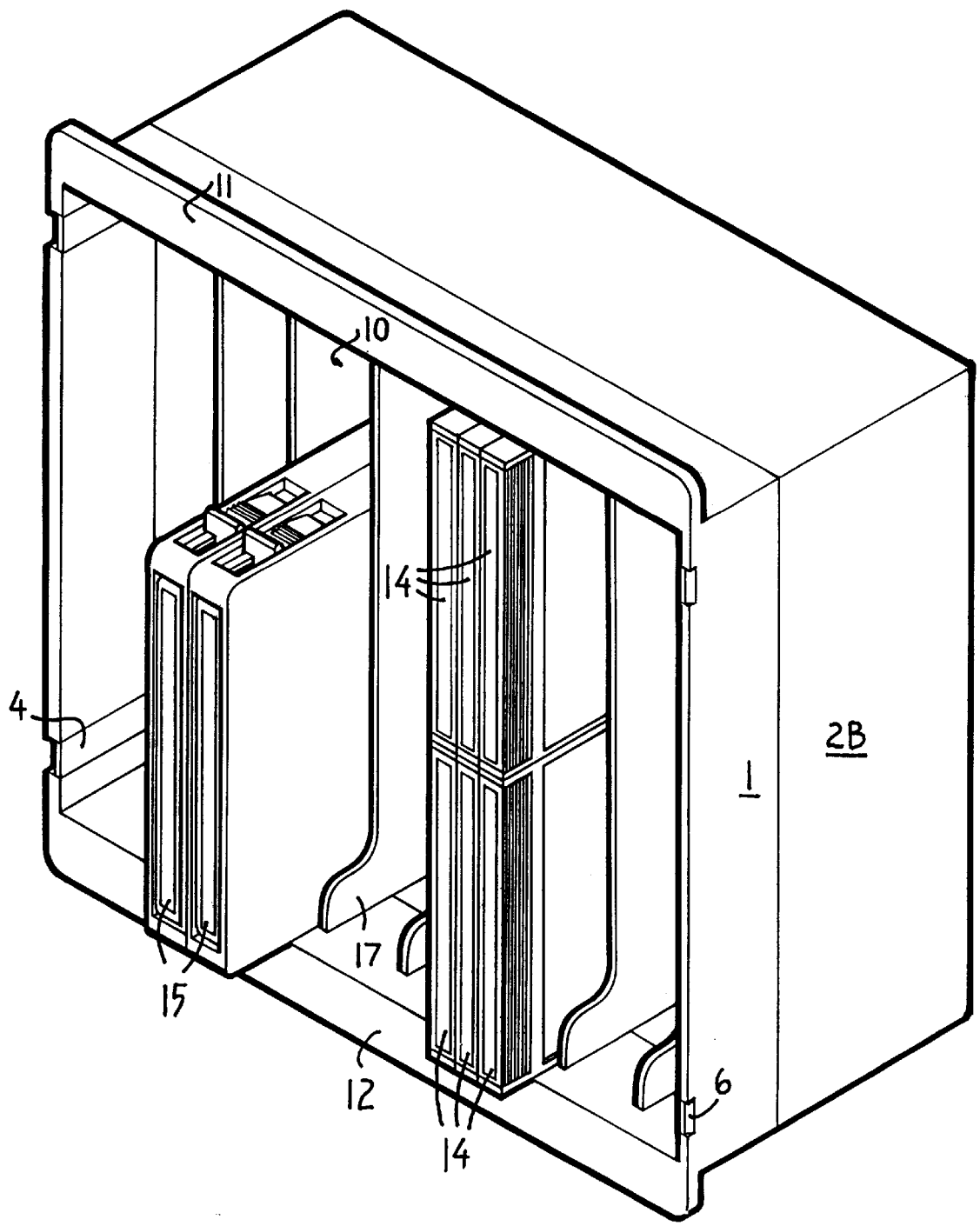
FIG. 3 illustrates an assembled multi-pack of substantial depth with a plurality of two similar sizes of cartridges installed in two different ways within the multi-pack.
Figure 4A:
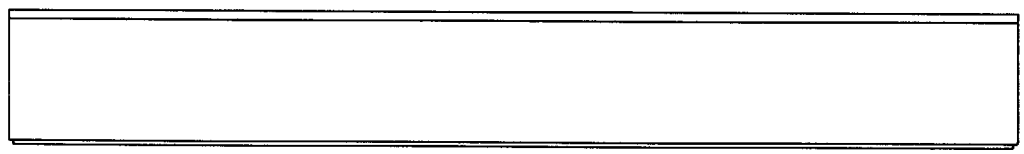
FIG. 4A–4M illustrates various other views of the invention
Figure 4B:
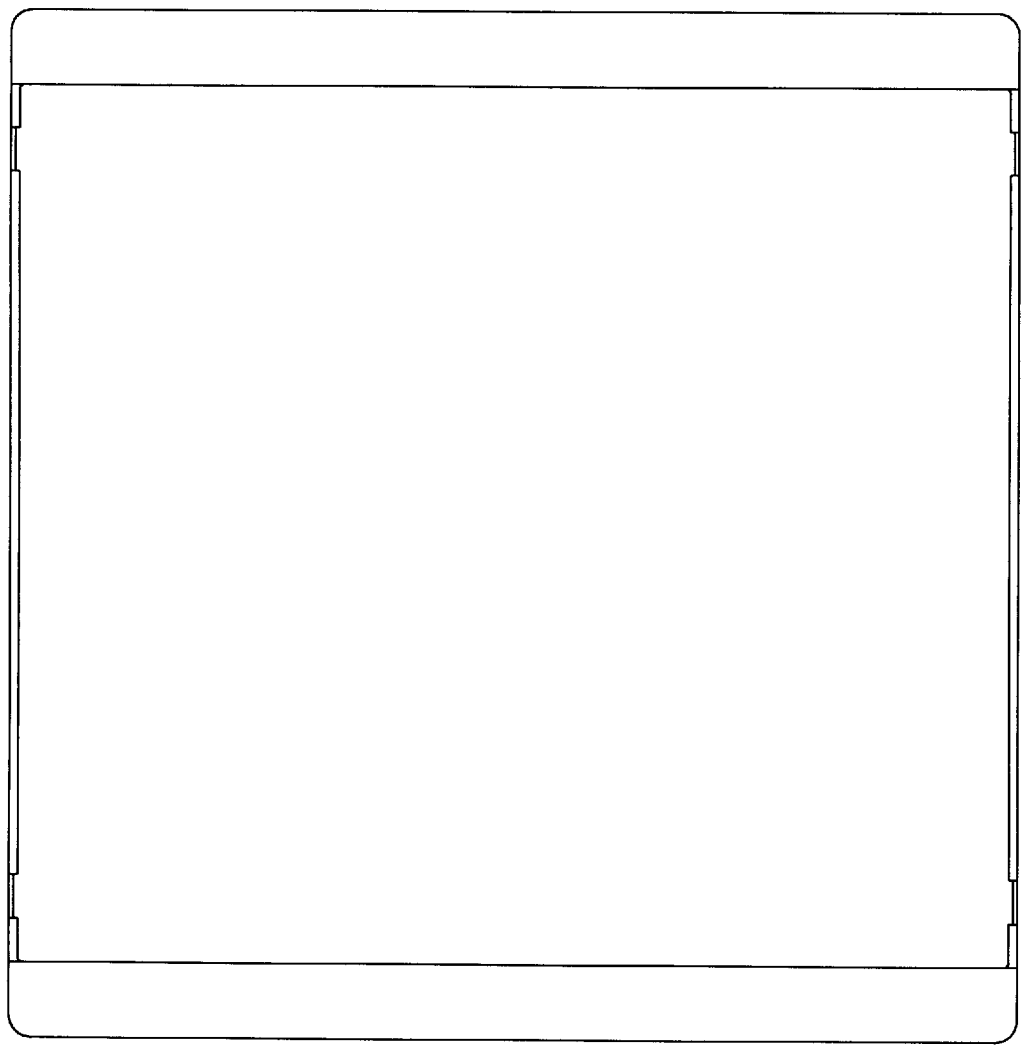
Figure 4C:
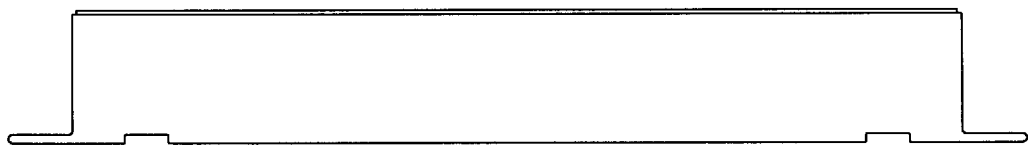
Figure 4D:
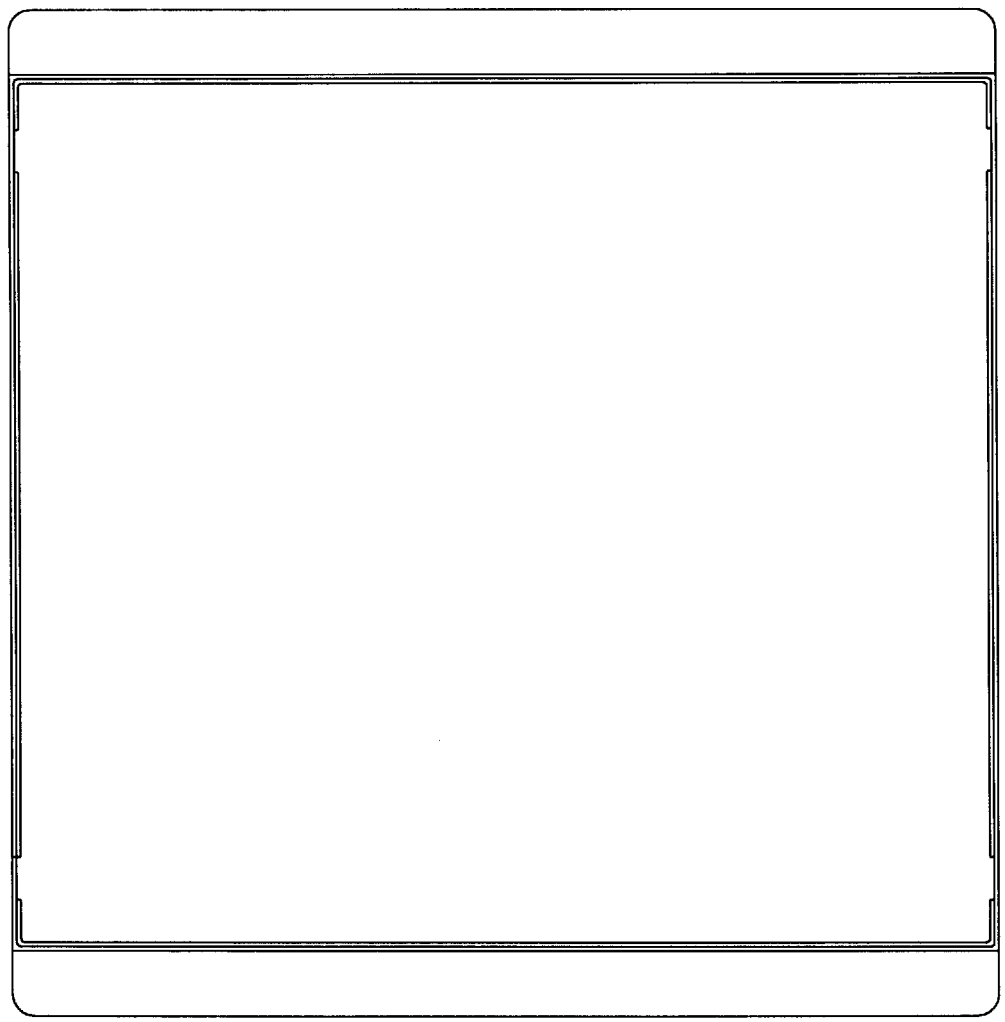
Figure 4E:
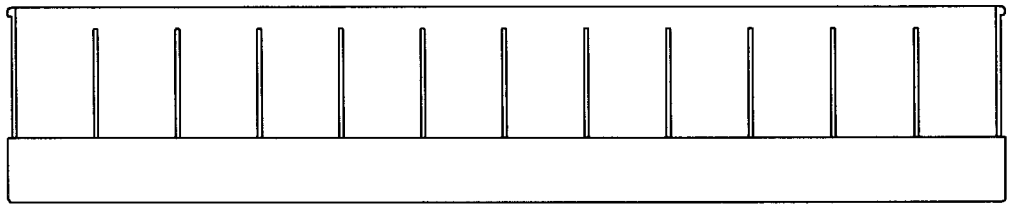
Figure 4F:
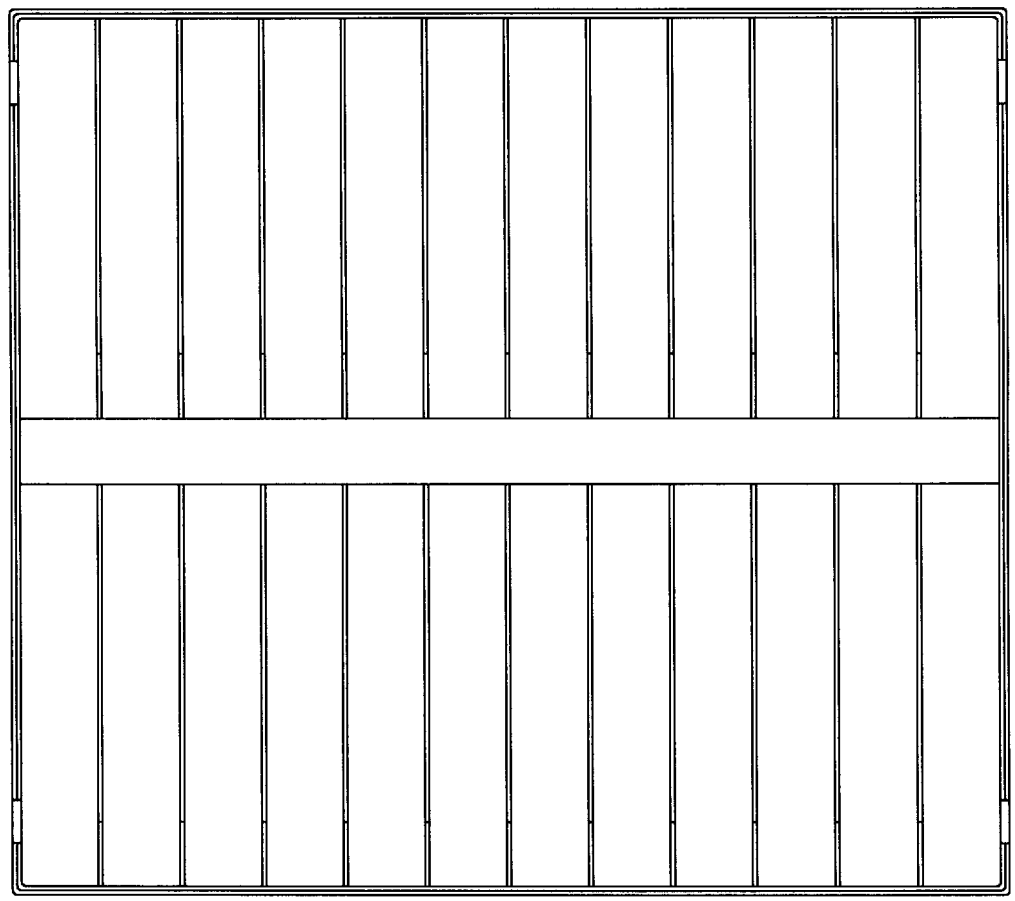
Figure 4G:
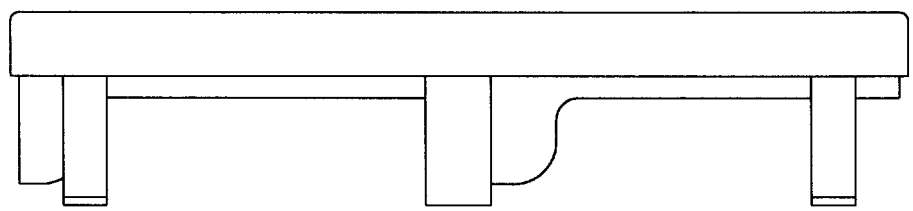
Figure 4H:
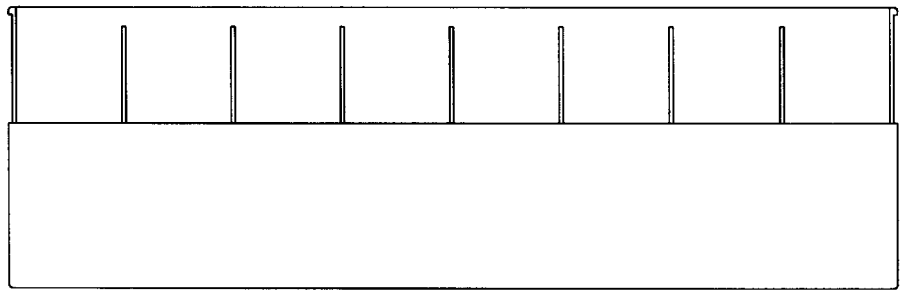
Figure 4I:
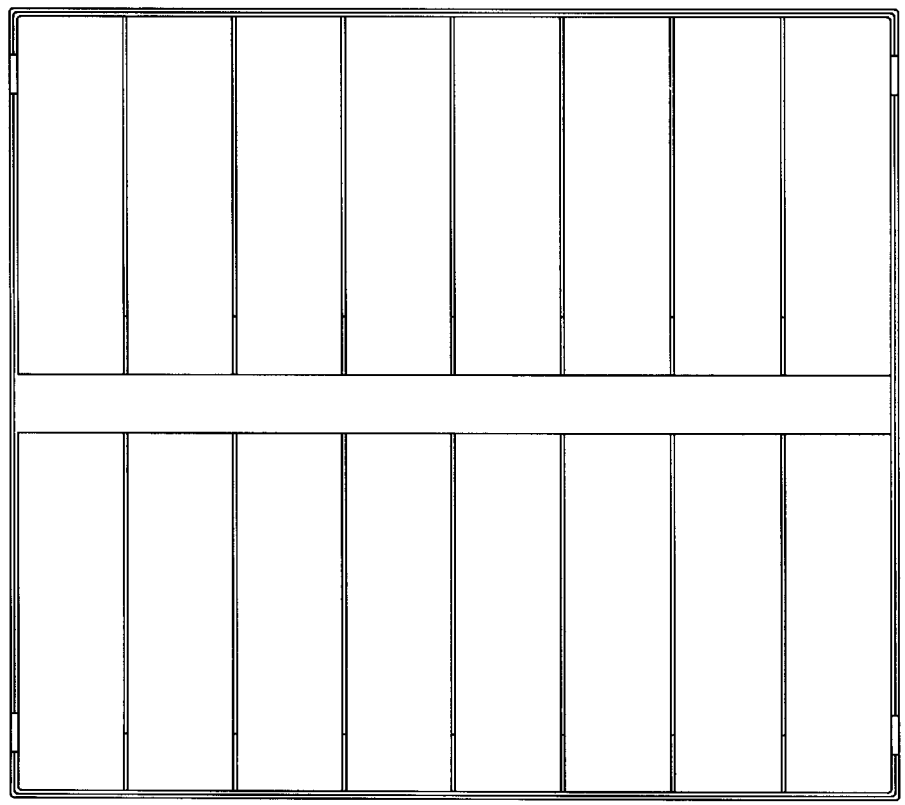
Figure 4J:
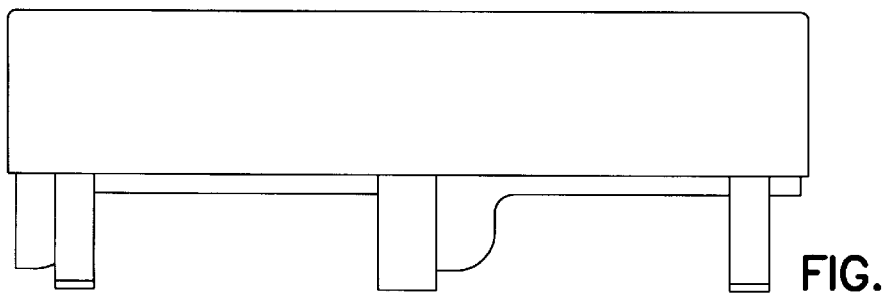
Figure 4K:
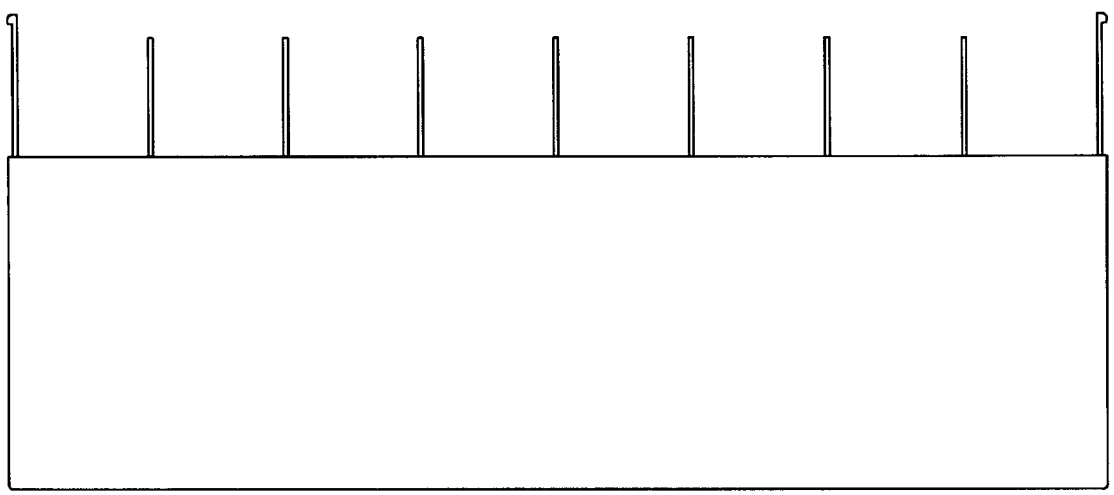
Figure 4L:
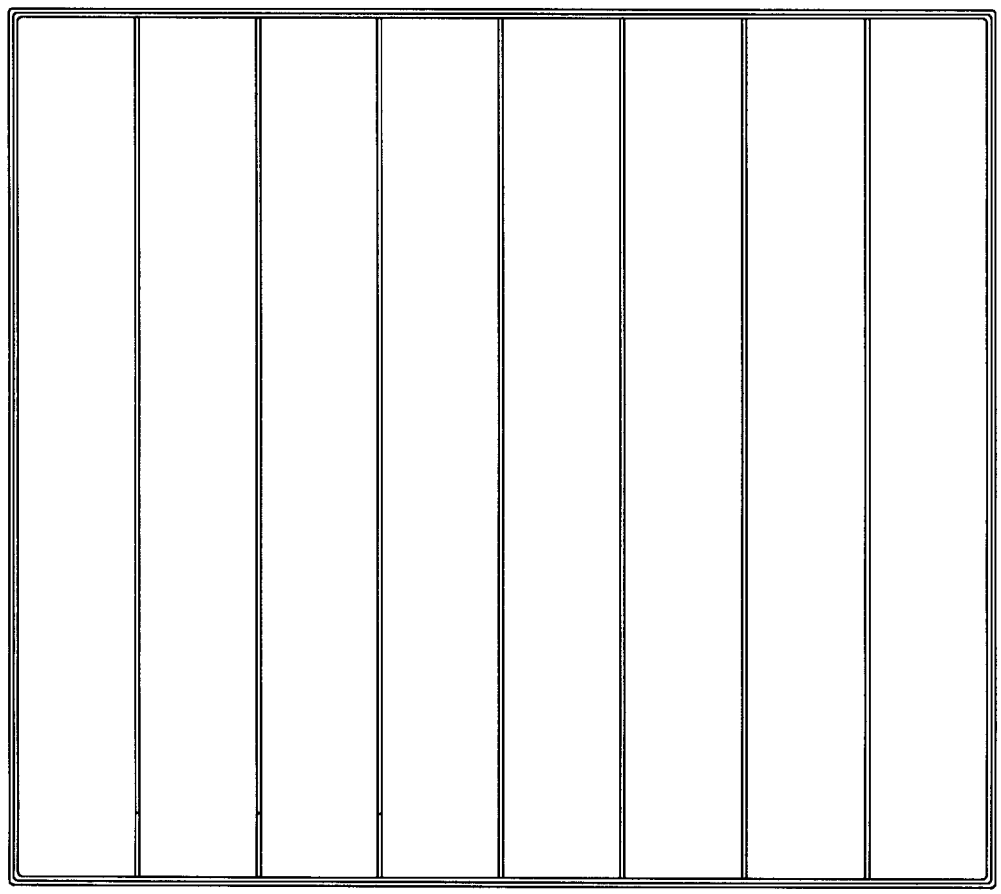
Figure 4M:
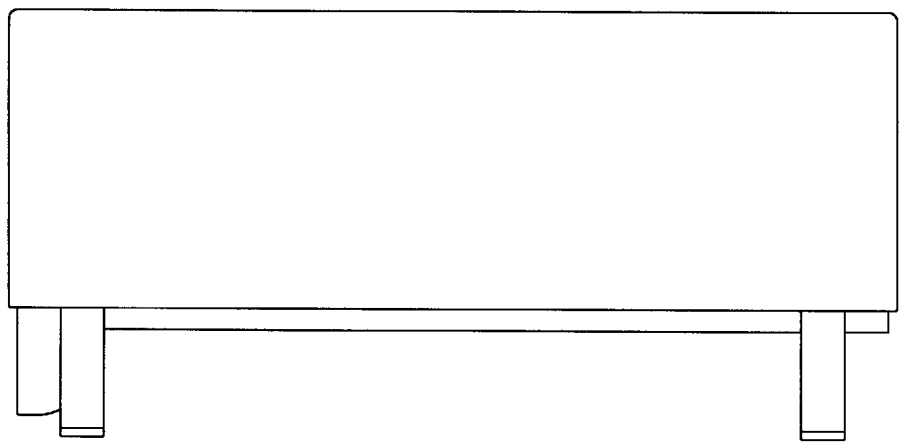

FIG. 3 illustrates the storage of media types 15 (e.g. 5¼ inch optical disk) and 16 (e.g. CD jewel cases) having one or more dimensions substantially different from media types 3, 13, and 14 shown in FIGS. 1 and 2. It also illustrates the ability to store different media 15 and 16 having some dimensional similarity to one another in multiple ways in the pack. Also shown is back unit 2B assembled with front frame 1. This assembled multi-pack further illustrates the flexibility of the invention to accommodate a plurality of media sizes within the height and width of a common front frame 1 by variance of the depth of back units 2, 2A and 2B and the design or spacing between dividers 17 of FIG. 1, FIG. 2 and FIG. 3 each of which is dimensionally unique.

A main advantage of this "split pack" approach is to reduce both tooling and manufacturing costs (for new media as it is invented) and pack purchase prices for end users. The front frame of the pack may be salvaged and reused even if new types of pack backs are purchased in the future. All other known packs, even those billed as "flexible" don't improve upon or maximize the media storage per cubic foot as does the preferred invention. Other approaches simply place new, very small media cartridges, in relatively large slots designed for standard cartridges.

Although anyone skilled in the art could produce a pack body whose entire outer body encompassed the media having the largest dimension desired to be enclosed and to further insert a space divider frame into the body to create multiple substantially identical smaller media storage spaces, that approach has been anticipated as being less desirable than the current invention. It is contemplated that other less desirable approaches to space division within a pack body that allows for the subdivision of multiple larger spaces to accommodate a single of multiple smaller media units within the basic larger spaces could be achieved by those skilled in the art. Accordingly, the examples set out above are merely exemplary and do not limit the scope of the invention, which is determined only by the appended claims.

What is claimed is:

1. A storage container for storing media items, the storage container comprising:
   at least one front frame having an upper flange and a lower flange integral therewith;
   at least one back unit capable of supporting a multiplicity of media storage containers;
   wherein the at least one front frame is configured to removably couple with the at least one back unit;
   at least one locking bar adapted to couple with a corresponding alignment slot said alignment slot formed on the front frame; and
   the locking bar comprising a hook adapted to engage with a corresponding locking slot formed on the front frame.

2. The storage container as recited in claim 1, wherein the back unit comprises at least one divider integral therewith.

3. The storage container as recited in claim 2, wherein the back unit comprises a plurality of dividers, where each divider extends from a top portion of the back unit to a bottom portion of the back unit.

4. A storage container for storing media items, the storage container comprising:
   at least one front frame having an upper flange and a lower flange integral therewith;
   at least one back unit capable of supporting a multiplicity of media storage containers;
   wherein the at least one front frame is configured to removably couple with the at least one back unit; and
   an outer lip on the back unit offset corresponding to a groove of a rear edge of the front frame.

5. A storage container for storing media items the storage container comprising:
   at least one front frame having an upper flange and a lower flange integral therewith;
   at least one back unit capable of supporting a multiplicity of media storage containers;
   wherein the at least one front frame is configured to removably couple with the at least one back unit; and
   wherein the front frame has two fixed perpendicular dimensions and wherein the back unit has a third dimension which is perpendicular to the plane of the two fixed dimensions.

6. The storage container as recited in claim 1, wherein the container is variably divisible in order to create various storage spaces for one or more types of substantially similar sized or identical media items.

7. A storage system for storing media items, the system comprising:
   a storage rack structure;
   a plurality of first components adapted to engage the storage rack structure to be supported thereby, each of the first components conforming to a common shape, the common shape comprising:
      at least one front frame having an upper flange and a lower flange integral therewith;
      a plurality of sets of container portions, each container portion being engageable with the first component, each container portion of a respective set defining one or more recesses for accommodating media items of corresponding shape, and container portions of different sets defining respective recesses adapted to accommodate media items of mutually different shapes, at least one back unit capable of supporting a multiplicity of media storage containers;
      wherein the at least one front frame is configured to removably couple with the at least one back unit;
      wherein the front frame has two fixed perpendicular dimensions and wherein the back unit has a third dimension which is perpendicular to the plane of the two fixed dimensions; and
      whereby a storage means is assemblable in use by engaging container portions selected from the sets of container portions with respective first components and engaging the first components with the storage rack structure.

8. The storage system as recited in claim 7, further comprising a plurality of first components, where each of the first components being engageable with any one of the container portions.

9. The storage system as recited in claim 7, wherein the first component and the container portion are each molded.

* * * * *